(12) United States Patent
Hamatani

(10) Patent No.: US 7,555,760 B2
(45) Date of Patent: Jun. 30, 2009

(54) OPTICAL HEAD

(75) Inventor: Yutaro Hamatani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 456 days.

(21) Appl. No.: 11/505,991

(22) Filed: Aug. 18, 2006

(65) Prior Publication Data

US 2007/0041286 A1  Feb. 22, 2007

(30) Foreign Application Priority Data

Aug. 22, 2005 (JP) ............................. 2005-239564

(51) Int. Cl.
*G11B 7/09* (2006.01)
(52) U.S. Cl. ..................................... 720/681
(58) Field of Classification Search ......... 720/681–687; 369/44.14–44.24, 44.32
See application file for complete search history.

(56) References Cited

U.S. PATENT DOCUMENTS

| | | | | |
|---|---|---|---|---|
| 5,008,873 A | * | 4/1991 | Tanaka et al. | 369/44.14 |
| 5,267,089 A | * | 11/1993 | Yamamoto et al. | 359/822 |
| 5,815,483 A | * | 9/1998 | Iizuka | 720/674 |
| 5,956,188 A | * | 9/1999 | Lee | 359/822 |
| 6,369,963 B1 | * | 4/2002 | Hotta et al. | 359/824 |
| 2004/0076107 A1 | * | 4/2004 | Sogawa et al. | 369/244 |

FOREIGN PATENT DOCUMENTS

| | | | | |
|---|---|---|---|---|
| JP | 8-161756 | | | 6/1996 |
| JP | 2001250242 A | * | | 9/2001 |
| JP | 2003272198 A | * | | 9/2003 |
| JP | 2007149247 A | * | | 6/2007 |

* cited by examiner

*Primary Examiner*—William J Klimowicz
(74) *Attorney, Agent, or Firm*—Morgan, Lewis & Bockius LLP

(57) ABSTRACT

An optical head, in which a spring stopper rib, as formed in a slide base, includes a post portion protruding from the upper face of the slide base, and a spring stopper portion for stopping a spring, and in which the spring receiving portion of an actuator has a recess formed for arranging the spring.

5 Claims, 6 Drawing Sheets

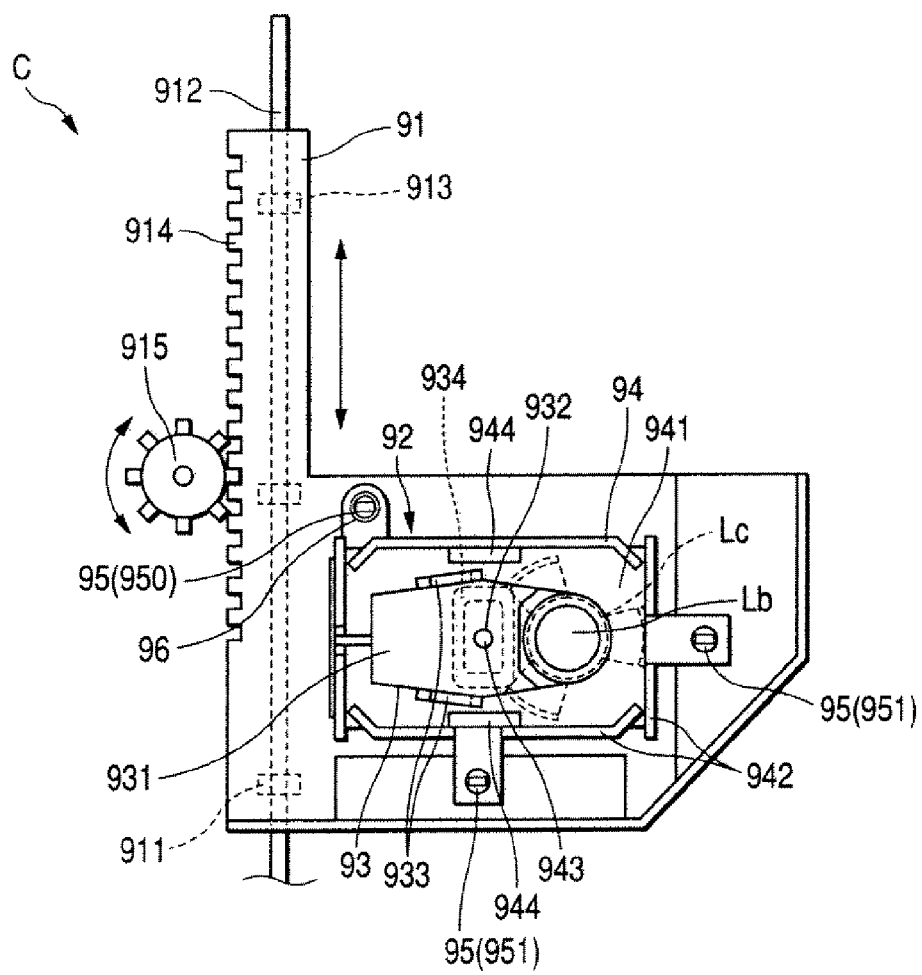
FIG. 8  -Prior Art-
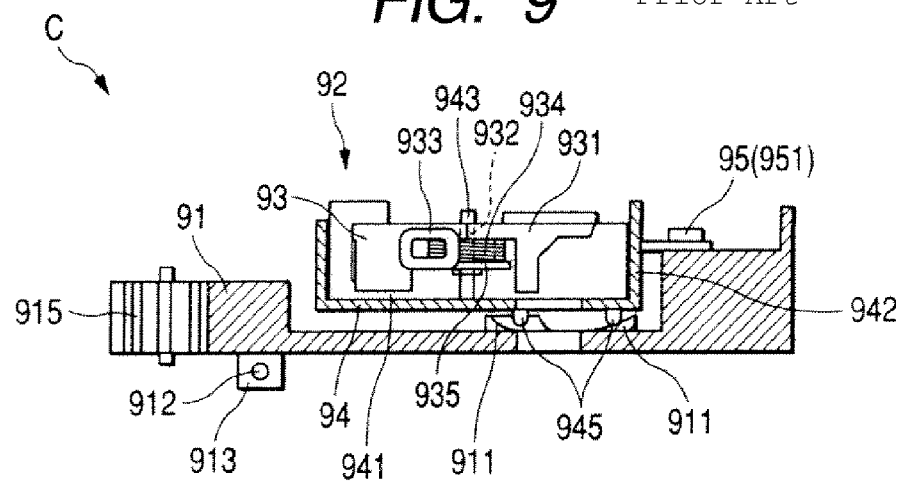
FIG. 9  -Prior Art-

OPTICAL HEAD

BACKGROUND OF THE INVENTION

1. Field of the Invention

The present invention relates to an optical disk device, which is enabled to record and/or read data by irradiating an optical disk with a light and, more particularly, to an optical head for irradiating the optical disk with a light.

2. Description of the Related Art

In recent years, a medium for recording images, voices or information has been mostly exemplified by an optical disk, which can-record and/or read when irradiated with a light. The CD (Compact Disc), the DVD (Digital Versatile Disc) and so on are widely used as the optical disk. An optical disk device for recording and/or reading the data in/from the optical disk as the recording medium is provided with an optical head for irradiating the recording face of the optical disk with a laser beam and detecting the light reflected.

FIG. 1 is an arrangement diagram of the optical head. As shown in FIG. 1, the optical head includes a laser beam source Ld, a mirror Mr, a collimator lens Lc, an objective lens Lb, a beam splitter Bs and a light receiving element Pd. The laser beam, as emitted from the laser light source Ld, partially transmits through the beam splitter Bs, and is reflected by the mirror Mr into the collimator lens Lc. The laser beam having entered the collimator lens Lc is projected as a parallel beam into the objective lens Lb. The laser beam having entered the objective lens Lc irradiates the recording face of an optical disk Ds.

At this time, the laser beam is focused on the recording layer of the optical disk Ds and is emitted such that the optical axis and the recording layer of the optical disk Ds are normal to each other. The beam splitter Bs is a prism for transmitting and reflecting the incident laser beam by half and for introducing the laser beam reflected by the optical disk Ds into the light receiving element Pd. This light receiving element converts the light into an electric current so that the data is read out according to the intensity of light.

FIG. 8 is a top plan view of an optical head of the related art, and FIG. 9 is a sectional view of an actuator shown in FIG. 8. An optical head C, as shown in FIG. 8, is provided with a slide base 91 for supporting the collimator lens Lc, and an actuator 92 for driving the objective lens Lb. The slide base 91 is provided, on its upper face, with ball seats 911 for forming a large common spherical face, and, on its side face, with a shaft 912 formed for regulating the action of the optical head C in a disk track direction (or a disk radius direction), a sliding hole 913 slidably engaging with the shaft 912, a rack 914 formed adjacent to the sliding hole 913, and a pinion 915 meshing with the rack 914.

The actuator 92 includes the objective lens Lb, a lens holder 93 for holding the objective lens Lb, and an actuator base 94 for supporting the lens holder 93.

The lens holder 93 includes: a lens holding unit 931 for holding the objective lens Lb; a shaft hole 932 for fitting the later-described shaft 943 of the base 94 slidably and rotatably therein; a tracking coil 933 for rocking the lens holder 93 around the shaft 943; a focusing coil 934 for sliding the lens holder 93 along the shaft 943; and a magnetic plate 935 for receiving a magnetic force generated by the later-described permanent magnet disposed in the actuator base 94.

The actuator base 94 includes: a bottom face 941 having a rectangular shape in a top plan view; rising walls 942 rising from the four sides of the bottom face 941; the shaft 943 protruding from the bottom face 941 into the case; a permanent magnet 944 rising across the shaft 943 and arranged to confront the rising walls 942; and protrusions 945 formed on the back side of the bottom face 941 and having their leading ends formed into ball faces to contact with the ball seats 911 of the slide base 91. The actuator 92 is placed such that the protrusions 945 of the actuator base 94 can slide on the ball seats 911 of the slide base 91. The shaft 943 is made of a magnetic material so that a magnetic field is generated between the permanent magnet 944 and the shaft 943.

The shaft 943 is so arranged in the actuator base 94 as to be rotatably and slidably fitted in the shaft hole 932 of the lens holder 93. At this time, the magnetic plate 935 of the lens holder 93 is arranged in the magnetic field which is established between the permanent magnet 944 and the shaft 943. The magnetic plate 935 is arranged in the magnetic field so that the magnetic force is applied to the magnetic plate 935. The lens holder 93 is supported in such a floating state by the magnetic force applied to the magnetic plate 935 that it may not contact with the actuator base 94.

The Lorentz's force is generated in the tracking coil 933 by feeding the electric current to the tracking coil 933. The lens holder 93 is rocked on the shaft 943 by this Lorentz's force. When the focusing coil 934 is fed with the electric current, on the other hand, the Lorentz's force is generated in the focusing coil 934. The lens holder 93 is slid by this Lorentz's force in the axial direction of the shaft 943.

As shown in FIG. 8, the actuator base 94 is fixed on the slide base 91 by fastening its three portions with screws 95, although not limited thereto. The screws 95 for fixing the actuator base 94 are so arranged to hold the orthogonal portions of the actuator base 94 having the rectangular shape in a top plan view, that one screw 950 is disposed near one corner whereas two screws 951 are so disposed at another corner as to interpose the same corner.

The single screw 950 is equipped with a spring 96. The actuator base 94 is biased toward the slide base 91 by the elastic force of the spring 96. The actuator base 94 receives the elastic force from the spring 96 mounted on the screw 950, and the curved faces of the protrusions 945 are moved in contact with the curved faces of the ball seats 911 by fastening or loosening the two screws 951 so properly that the protrusions 945 may slide and rotate on the ball seats 911. Thus, the actuator 92 can change its inclination smoothly with respect to the slide base 91. By adjusting the angle of the actuator 92 with respect to the slide base 91, the inclination of the optical axis of the laser beam projected from the objective lens Lb can be adjusted to irradiate the recording face of the optical disk Ds normally (refer to JP-A-8-161756).

SUMMARY OF THE INVENTION

In the case of the optical head C of the related art, however, the screw 950 has to be fastened thereby to require the screw 950 and an internally threaded hole for fastening the screw 950, so that the number of parts is accordingly increased to involve troubles for their mounting operations. As a result, the assembling troubles and the time period for manufacturing the optical head C are required to raise the cost for the assembly and for the parts thereby to raise the total cost for the manufacture.

In case the actuator base 94 is to be biased by holding the spring 96 with the screw 950, the elastic force by the spring 96 changes with the fastening extent of the screw 950. Specifically, if the degree of adjustment of the screw 951 changes with the fastening extent of the screw 950, the adjustment is easily complicated to take the troubles and the time period for the adjustment thereby to increase the time period and the cost for manufacturing the optical head C.

Therefore, the present invention has an object to provide an optical head, which can apply an elastic force by a spring to an actuator base, even without any screw for holding the spring to bias the actuator base elastically, and which can reduce the members composing the optical head, thereby to reduce the cost for the members of the optical head and to omit the time period and the troubles for the assembling works to lower the cost for the assembly.

Moreover, the present invention has an object to provide an optical head, which can apply an elastic force by a spring to an actuator base, even without any bolt for holding the spring to bias the actuator base elastically, and which can omit the screw fastening step at the assembling time, thereby to suppress a problem that an insufficient fastening or a loosening of the screw fails to apply the elastic force of the spring sufficiently to the actuator base.

In order to achieve the aforementioned objects, according to an aspect of the invention, there is provided an optical head for recording/reading data by irradiating an optical disk with a laser beam, comprising: a slide base for holding a laser beam source for emitting a laser beam, a mirror for reflecting the laser beam, a collimator lens for collimating the laser beam into a parallel beam, a beam splitter for splitting the beam reflected on the optical disk and a light receiving element for receiving and converting a light into electric signals; and an actuator for holding an objective lens mounted on the slide base for irradiating the optical disk with the laser beam; wherein the slide base includes: a spring stopper rib having a post portion protruding from the slide base, and a spring stopper portion arranged perpendicular to the post portion and in parallel with the slide base; and three ball seats for forming a common spherical face; the actuator includes: a lens holder for holding the objective lens; an actuator base for arranging the lens holder therein; a spring for biasing the actuator base; and screws for adjusting the angle of and fixing the actuator base; the actuator base includes: a rectangular bottom portion; rising portions rising from the four sides of the bottom portion; a cylindrical shaft protruding from the substantial center of the bottom portion and fitted rotatably and slidably in the lens holder; three protrusions arranged on the back side of the bottom portion and having their leading ends formed into ball shapes to abut against the ball seats; a spring receiving portion protruding from the vicinity of a predetermined corner of the bottom portion to the same plane as that of the bottom portion, for receiving the spring; and angle adjusting portions formed at such two of the rising portions as continue to the corner arranged orthogonally of the corner having the spring receiving portion arranged therein, for receiving the screws and for adjusting the angle with the screws; when the protrusions are arranged to abut against the ball seats, the spring stopper portion and the spring receiving portion confront each other, the spring stopper portion has a protrusion provided with a slope formed to confront the post portion whereas the spring receiving portion is provided, on its side facing the side of the post portion, with a recess having no side wall portion; and the spring has its one end portion fitted on the protrusion and its other end portion fitted in the protrusion thereby to prevent the spring from coming out and to apply an elastic force to the slide base through the spring receiving portion.

According to this configuration, the spring for biasing the elastic force to the actuator base is utilized as the spring stopper rib so that the elastic force by the spring can be applied to the actuator base. As a result, the adjustment of the inclination of the actuator base can be performed by turning the screw thereby to reduce the members composing the optical head.

As a result, it is possible to reduce the cost for the members of the optical head and to omit the time period and the troubles for the assembling works thereby to lower the cost for the assembly.

Moreover, the spring for applying the elastic force to the actuator base utilizes the spring stopper rib so that the clearance between the spring stopper portion of the spring stopper rib and the spring receiving portion of the actuator base can be retained to apply the elastic force by the spring properly to the actuator base. As a result, after the adjustment was made to irradiate the optical disk precisely with the laser beam, the actuator can be prevented from moving, so that the read and/or record of data can be precisely performed accordingly stably for a long time.

In order to achieve the aforementioned objects, according to another aspect of the invention, there is provided an optical head recording/reading data by irradiating an optical disk with a laser beam, comprising: a slide base; and an actuator for holding an objective lens mounted on the slide base for irradiating the optical disk with the laser beam; wherein the slide base includes: a spring stopper rib having a post portion protruding from the slide base, and a spring stopper portion arranged perpendicular to the post portion and in parallel with the slide base; and three ball seats for forming a common spherical face; the actuator includes: a lens holder for holding the objective lens; an actuator base for arranging the lens holder therein; a spring for biasing the actuator base; and screws for adjusting the angle of and fixing the actuator base; the actuator base includes: a rectangular bottom portion; a plurality of protrusions arranged on the back side of the bottom portion and having their leading ends formed into ball shapes to abut against the ball seats; a spring receiving portion protruding from the vicinity of a predetermined corner of the bottom portion to the same plane as that of the bottom portion, for receiving the spring; and angle adjusting portions formed at such two of the four sides of the bottom portion as continue to the corner arranged orthogonally of the corner having the spring receiving portion arranged therein, for receiving the screws and for adjusting the angle with the screws; when the protrusions are arranged to abut against the ball seats, the spring stopper portion and the spring receiving portion confront each other, the spring stopper portion and the spring receiving portion have a come-out preventing portion for preventing the spring from coming out; and the spring has its two end portions individually engaging with the come-out preventing portion thereby to prevent the spring from coming out and to apply an elastic force to the slide base through the spring receiving portion.

According to this configuration, the spring for biasing the elastic force to the actuator base is utilized as the spring stopper rib so that the elastic force by the spring can be applied to the actuator base. As a result, the adjustment of the inclination of the actuator base can be performed by turning the screw thereby to reduce the members composing the optical head.

As a result, it is possible to reduce the cost for the members of the optical head and to omit the time period and the troubles for the assembling works thereby to lower the cost for the assembly.

Moreover, the spring for applying the elastic force to the actuator base utilizes the spring stopper rib so that the clearance between the spring stopper portion of the spring stopper rib and the spring receiving portion of the actuator base can be retained to apply the elastic force by the spring properly to the actuator base. As a result, after the adjustment was made to irradiate the optical disk precisely with the laser beam, the actuator can be prevented from moving, so that the read and/or record of data can be precisely performed accordingly stably for a long time.

In the aforementioned constitution, the come-out preventing portion belonging to the spring receiving portion may be the recess or the protrusion. In case the come-out preventing portion of the spring receiving portion is the protrusion, it may be so inclined toward the post portion as to elongate the distance from the spring receiving portion.

In the aforementioned constitution, the come-out preventing portion belonging to the spring receiving portion may be a protrusion inclined to shorten the distance from the spring receiving portion toward the post portion.

According to the present invention, there can be provided an optical head, in which the elastic force by the spring can be applied to the actuator base, even without any screw for holding the spring to bias the actuator base elastically, and in which the members composing the optical head can be reduced to reduce the cost for the members of the optical head and to omit the time period and the troubles for the assembling works thereby to lower the cost for the assembly.

According to the present invention, there can also be provided an optical head, in which the elastic force by the spring can be applied to an actuator base, even without any bolt for holding the spring to bias the actuator base elastically, and in which the screw fastening step at the assembling time can be omitted to suppress a problem that the insufficient fastening or the loosening of the screw fails to apply the elastic force of the spring sufficiently to the actuator base.

After the adjustment was made to irradiate the optical disk precisely with the laser beam, the actuator can be prevented from moving, so that the read and/or record of data can be precisely performed accordingly stably for a long time.

BRIEF DESCRIPTION OF THE DRAWINGS

FIG. 8 is a top plan view of an optical head of the related art; and

FIG. 9 is a sectional view of an actuator shown in FIG. 8.

DETAILED DESCRIPTION OF THE PREFERRED EMBODIMENTS

Figure 1:
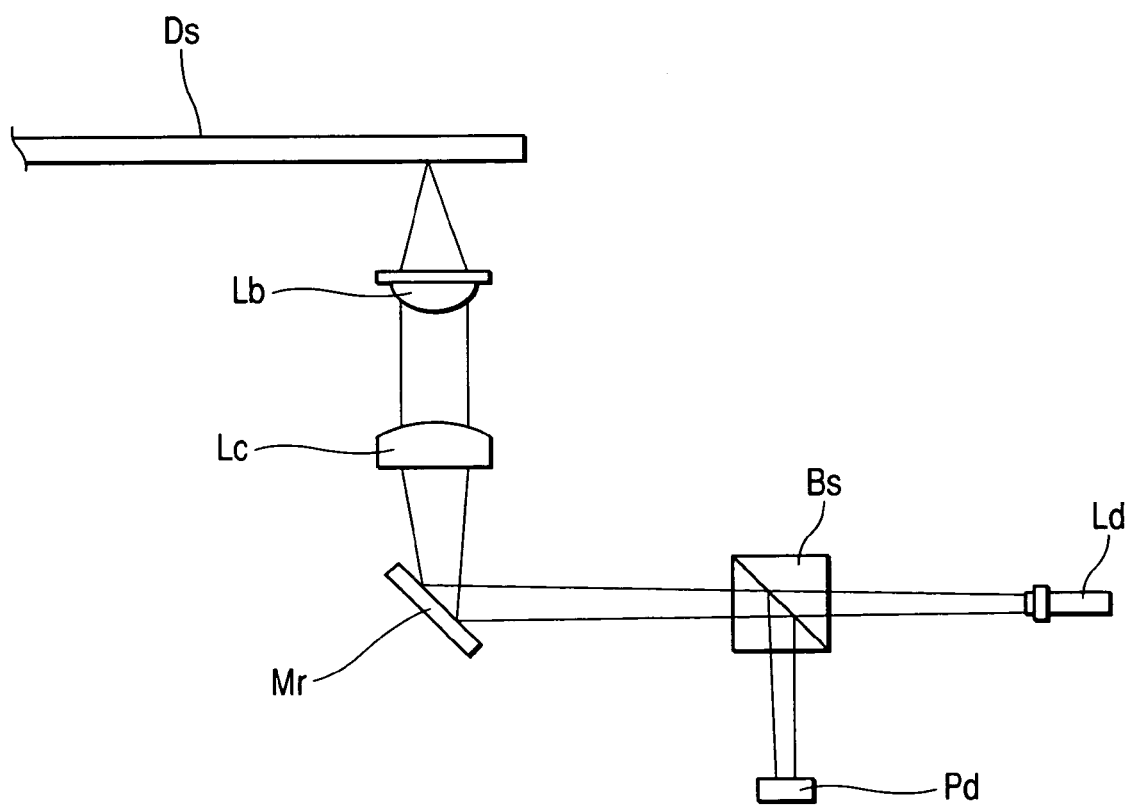
FIG. 1 is an arrangement diagram of one example of an optical head.

A embodiment of the invention will be described with reference to the accompanying drawings. FIG. 1 is an arrangement diagram showing one example of an optical head. Specifically, the optical head C includes a laser beam source Ld, a mirror Mr, a collimator lens Lc, an objective lens Lb, a beam splitter Bs and a light receiving element Pd. The laser beam, as emitted from the laser beam source Ld, partially transmits through the beam splitter Bs and is reflected by the mirror Mr into the collimator lens Lc so that it emanates as a parallel beam from the collimator lens Lc. The laser beam, as projected from the collimator lens Lc, enters the objective lens Lb, so that it is focused to irradiate an optical disk Ds by the objective lens Lb.

At this time, the laser beam is so guided that it is focused on the recording face of the optical disk Ds and that its optical axis is normal to the recording face of the optical disk Ds. The beam splitter Bs is a prism for transmitting and reflecting the incident laser beam by halves, and guides the light reflected on the optical disk Ds, into the light receiving element Pd. This light receiving element Pd converts a light into an electric current, and reads out data according to the intensity of light.

Figure 2:
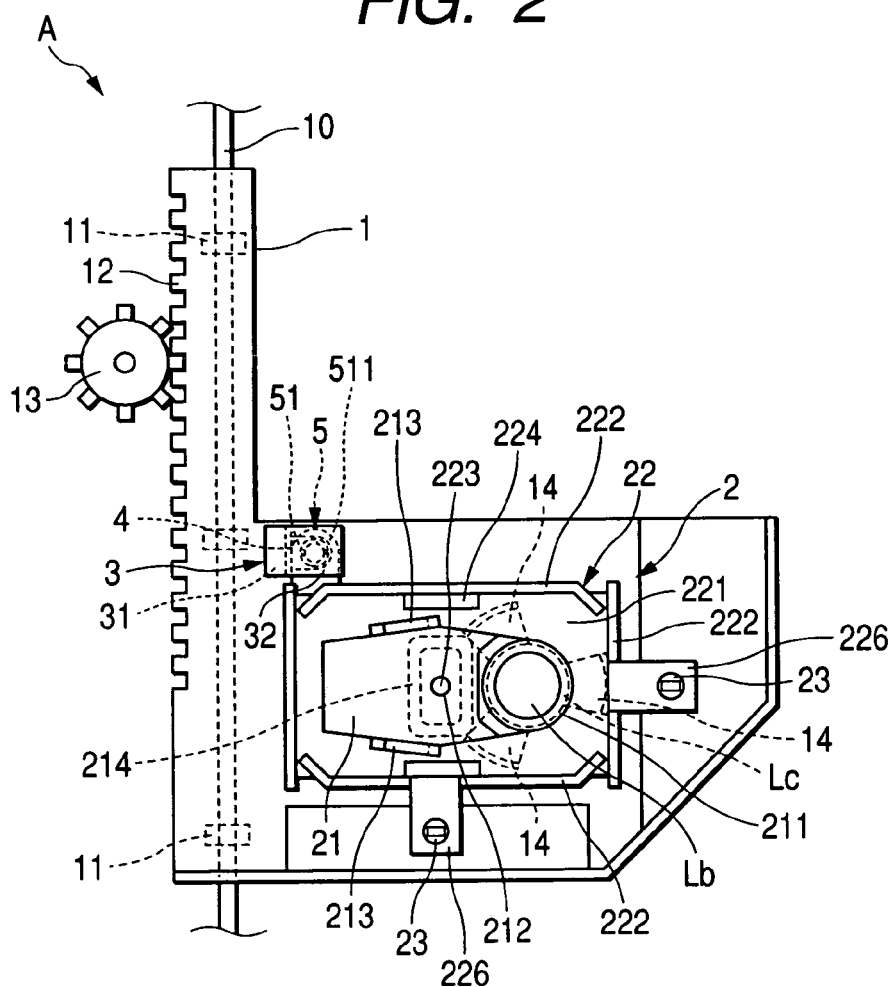
FIG. 2 is a top plan view of an optical head according to the invention.
Figure 3:
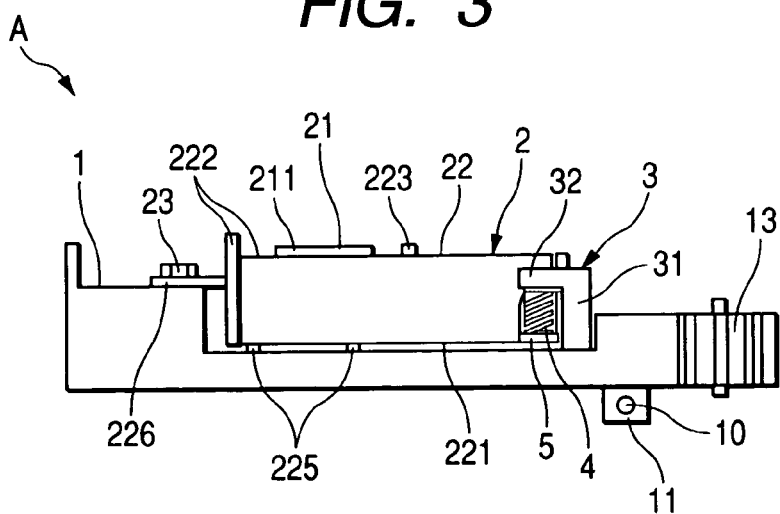
FIG. 3 is a side elevation of the optical head shown in FIG. 2.
Figure 4:
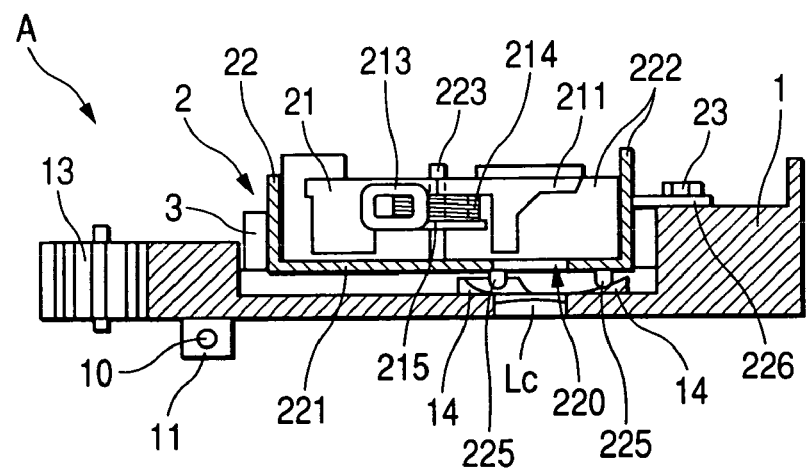
FIG. 4 is a sectional side elevation of the optical head shown in FIG. 2.

FIG. 2 is a top plan view of the optical head according to the embodiment. FIG. 3 is a side elevation of the optical head shown in FIG. 2. FIG. 4 is the sectional side elevation of the optical head shown in FIG. 2. The optical head A is provided with: the slide base 1 for holding the laser beam source Ld, the beam splitter Bs, the mirror Mr, the collimator lens Lc and the light receiving element Pd; and an actuator 2 for holding the objective lens Lb.

The slide base 1 is provided, on its side face, with: a shaft 10 formed for regulating the actions of the optical head A in a disk track direction (or the disk radius direction); a sliding hole 11 for slidably engaging with the shaft 10; a rack 12 formed adjacent to the sliding hole 11; a pinion 13 for meshing with the rack 12; three ball seats 14 for abutting against the later-described protrusions 225 formed on the lower face of the actuator 2, to form a large common spherical face; and a spring stopper rib 3 arranged across a spring to confront the spring receiving portion 226 of the later-described actuator base 22.

The actuator 2 includes: the objective lens Lb; a lens holder 21 for holding the objective lens Lb; the actuator base 22 having the lens holder 21 arranged therein; the spring 4 for biasing the actuator 2; and a screw 23 for adjusting the angle of and fixing the actuator 2.

The actuator base 22 has a rectangular shape in a top plan view, and includes: a bottom portion 221; rising portions 222 rising from the periphery of the bottom portion 221 and normally from the bottom portion 221; a cylindrical shaft 223 protruding from the substantially central portion of the bottom portion 221 and in the same direction of the rising portions 222; two permanent magnets 224 arranged on the rising portions 222 and confronting each other through the shaft 223; and the three protrusions 225 arranged on the back face of the bottom portion 221 and in contact with the ball seats 14 and having their leading ends formed into a ball shape.

The actuator base 22 is provided with a spring receiving portion 5 protruding from the vicinity of the corner of the bottom portion 221 to the same plane as that of the bottom portion 221, for receiving the spring 4. Of the rising portions 222, moreover, the rising portion 222, which continues to the corner arranged orthogonally of the corner having the spring receiving portion 5 arranged thereat, is provided with the angle adjusting portion 226 for receiving the screw 23 and contacting with the head of the screw 23 thereby to adjust the angle.

The shaft 223 has an electric conductivity and is made of a magnetic material so that a magnetic field is established between the permanent magnets 224 and the shaft 223. Any magnetic field of the permanent magnets 224 is directed, although not limited thereto, such that the magnetic lines of force are directed from the permanent magnets 224 to the shaft 223. In the bottom portion 221, there is formed therethrough an optically transmissive hole 22 for transmitting the laser beam.

The lens holder 21 includes: a lens holding portion 211 for holding the objective lens Lb; a shaft hole 212 formed in the substantially central portion of the lens holding portion 211 for fitting the shaft 223 slidably and rotatably therein; tracking coils 213 arranged on the side faces of the lens holder 21 to confront each other through the shaft hole 212; a focusing coil 214 arranged to enclose the shaft hole 212; and a magnetic plate 215 arranged on the lower face of the focusing coil 214 and normally to the center axis of the shaft hole 212.

The shaft hole 212 is arranged and fitted on the shaft 223. At this time, a magnetic field is generated between the permanent magnets 224 of the actuator base 22 and the shaft 223, and the magnetic plate 215 is arranged in the magnetic field, so that the lens holder 21 is supported without any contact with the bottom portion 221 by the magnetic force applied to the magnetic plate 215.

Figure 5:
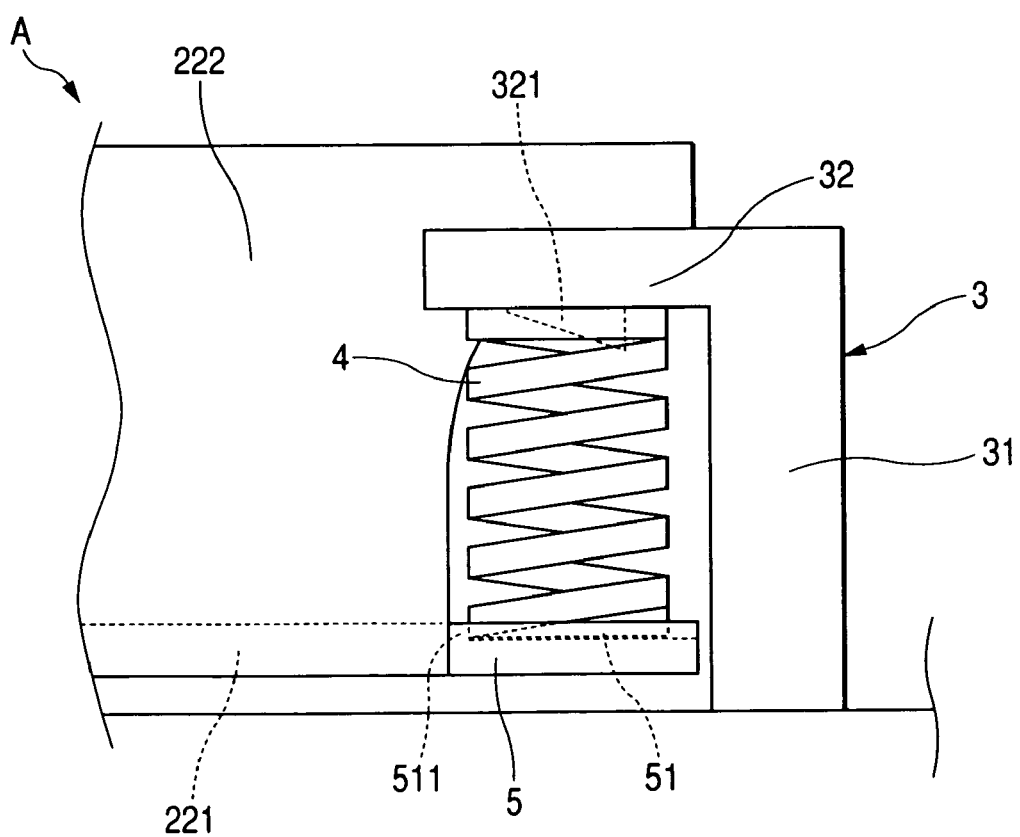
FIG. 5 is an enlarged view of a spring stopper portion of one example of the optical head shown in FIG. 2.
Figure 6:
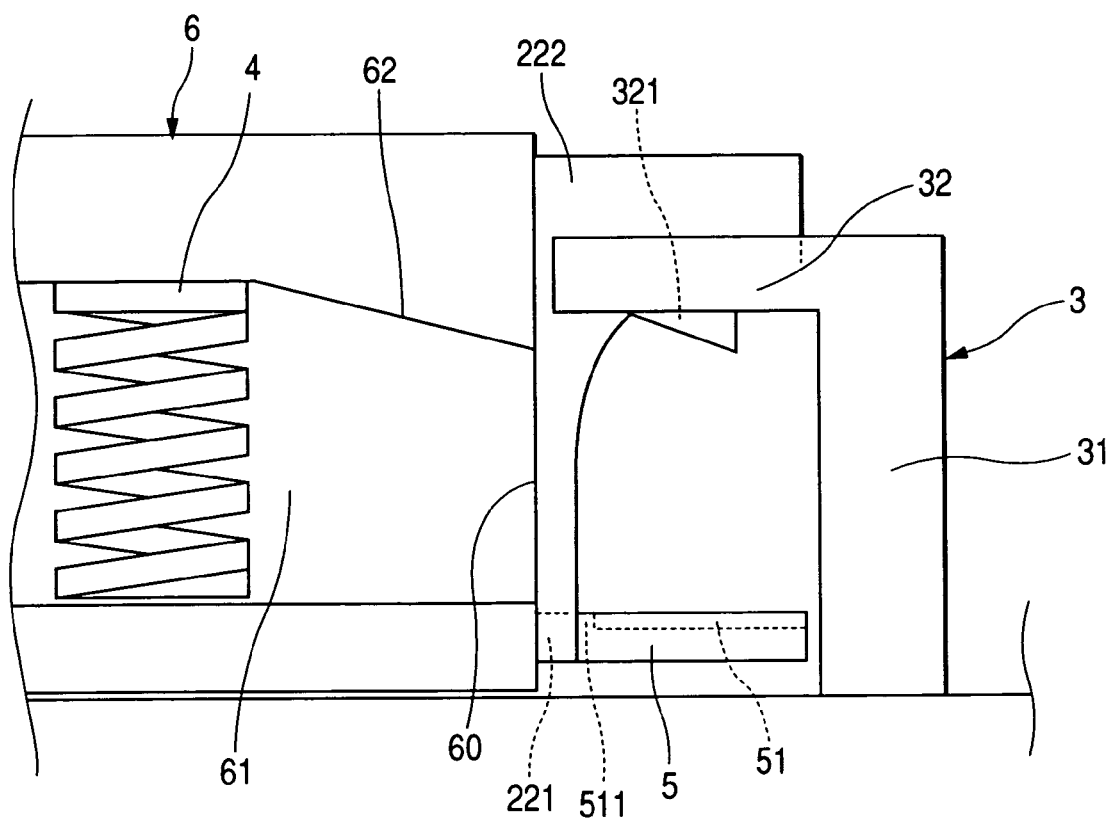
FIG. 6 is an enlarged view showing the time when a spring is mounted on the spring stopper portion shown in FIG. 5.

FIG. 5 is an enlarged view of the spring stopper portion as one example of the optical head shown in FIG. 2, and FIG. 6 is an enlarged view at the time when the spring is mounted on the spring stopper portion shown in FIG. 5. The spring stopper rib 3, as formed in the slide base 1, as shown in FIG. 5, includes a post portion 31 protruding from the upper face of the slide base 1, and a spring stopper portion 32 for stopping the spring 4. In the spring stopper portion 32, there is formed a protrusion 321 having a slope.

On the other hand, the spring receiving portion 5 of the actuator 2 has a recess 51 formed for arranging the spring 4, as shown in FIG. 5. Since the spring 4 is arranged in the recess 51, the spring 4 keeps contact, even if a transverse force is applied, with a side wall portion 511 of the recess 51, so that it is prevented from coming out.

In the recess 51 of the spring receiving portion 5, as shown in FIG. 5, the side wall portion 511 is omitted from the side, on which the post portion 31 of the spring stopper rib 3 is arranged. The spring 4 can be prevented, even if a force is applied in the direction having the side wall portion 511 omitted, from coming out by abutting against the post portion 31 of the spring stopper rib 3. Since the side wall portion 511 is omitted, the spring 4 can be increased in its abutting area so that the spring 4 can be accordingly prevented, even if the angle between the slide base 1 and the actuator base 22 should change within a predetermined range, from coming out of the spring receiving portion.

As shown in FIG. 6, the spring 4 is mounted by means of a jig 6. At this time, the actuator 2 is temporarily mounted on the slide base 1 by the screws 23. The jig 6 has a slide hole 61 formed for sliding the spring 4. The slide hole 61 is provided with a throttled portion 62 throttled outward from its midway. The spring 4 is compressed with the throttled portion 62 by sliding the slide hole 61 outward. At the exit 60 of the slide hole 61 of the jig 6, the spring 4 is so compressed that its length may be shorter than the spacing between the spring stopper portion 32 of the spring stopper rib 3 and the spring receiving portion 5.

The protrusion 321 of the spring stopper portion 32 is inclined toward the post portion 31. When the spring 4 is arranged on the protrusion 321, the compressed spring 4 generates a force in its restoring direction, i.e., in its extending direction so that the spring 4 slides along the slope of the protrusion 321 toward the post portion 31 and is properly arranged.

In this state, the actuator 2 has its angle adjusting portion 226 in slidable contact with the ball seats 14 so that the angle adjusting portion 226 can slide the ball seats 14. In other words, the actuator 2 is so supported by the slide base 1 that it can rock according to the ball shape formed by the ball seats 14. By mounting the spring 4, the actuator 2 is held still with its spring receiving portion 5 being pushed. By then fastening or loosening the screw 23 properly, the angle of the actuator 2 can be adjusted to an arbitrary angle within a predetermined range, thereby to adjust the angle of the optical axis of the laser beam which is to be projected from the objective lens Lb mounted on the lens holder 21 arranged in the actuator 2. By this adjustment, the laser beam can be projected such that its optical axis makes a proper angle with respect to the optical disk Ds.

Figure 7A:
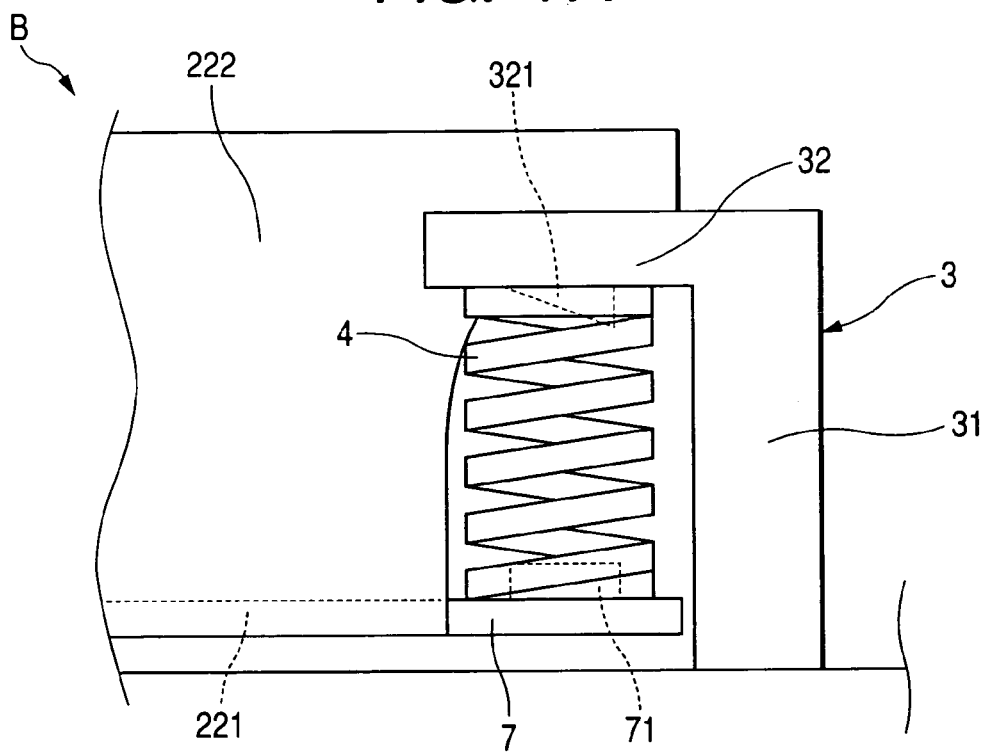
FIGS. 7A and 7B are enlarged views of spring stopper portions of other examples of the optical head according to the invention.
Figure 7B:
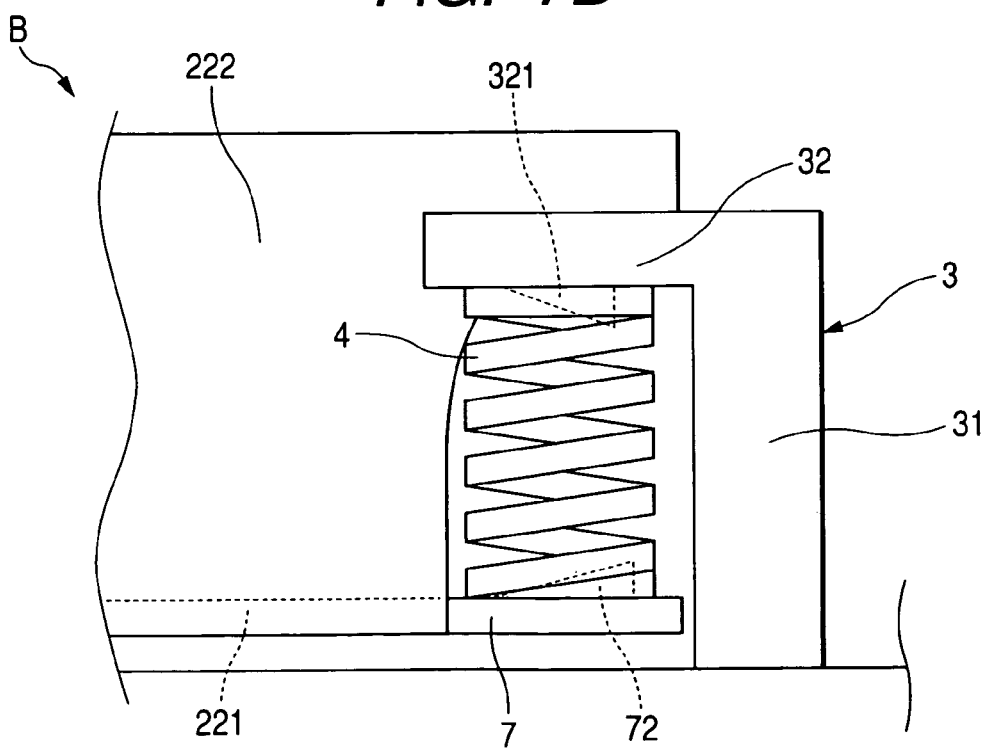

FIGS. 7A and 7B are enlarged views of spring stopper portions of another example of the optical head according to the invention. An optical head B, as shown in FIG. 7A, has the same shape as that of the optical head A shown in FIG. 2, FIG. 3 and so on, excepting that a spring receiving portion 7 of the actuator 2 has a different shape. The substantially identical portions are designated by the common reference numerals.

The spring receiving portion 7 of the optical head B, as shown in FIG. 7A, is provided with a come-out preventing protrusion 71 for preventing the spring 4 from coming out. With this come-out preventing protrusion 71 being formed, the coming-out of the spring 4 can be firmly suppressed even if a force is applied thereto. As shown in FIG. 7B, moreover, a come-out preventing protrusion 72 may have a slope ascending toward the post portion 31 of the spring stopper rib 3. With this slope, the spring 4 can be mounted, when pushed, along the slope. When the spring 4 is arranged in position, it can be prevented from coming out to the opposite side of the post portion 31.

The foregoing embodiment has been described on the example, in which the optical head performs a tracking operation to turn on the axis and a focusing operation to slide along the axis. However, the invention should not be limited thereto, but can be widely applied to the structure, in which the optical disk can be irradiated with the laser beam at a precise angle and in which the actuator base is supported by the ball seat portion of the slide base.

The optical head of the invention can be applied to the optical disk device which reads out information by irradiating the optical disk such as the DVD, the CD, the LD or the like with the laser beam and which records information in a writable optical disk.

What is claimed is:

1. An optical head for recording/reading data by irradiating an optical disk with a laser beam, comprising:
   a slide base for holding a laser beam source for emitting a laser beam, a mirror for reflecting the laser beam, a collimator lens for collimating the laser beam into a parallel beam, a beam splitter for splitting the beam reflected on the optical disk and a light receiving element for receiving and converting a light into electric signals; and
   an actuator for holding an objective lens mounted on the slide base for irradiating the optical disk with the laser beam;
   wherein the slide base includes: a spring stopper rib having a post portion protruding from the slide base, and a spring stopper portion arranged perpendicular to the post portion and in parallel with the slide base; and three ball seats for forming a common spherical face;
   the actuator includes: a lens holder for holding the objective lens; an actuator base for arranging the lens holder therein; a spring for biasing the actuator base; and screws for adjusting the angle of and fixing the actuator base;
   the actuator base includes: a rectangular bottom portion; rising portions rising from the four sides of the bottom portion; a cylindrical shaft protruding from the substantial center of the bottom portion and fitted rotatably and slidably in the lens holder; three protrusions arranged on the back side of the bottom portion and having their leading ends formed into ball shapes to abut against the ball seats; a spring receiving portion protruding from the vicinity of a predetermined corner of the bottom portion to the same plane as that of the bottom portion, for receiving the spring; and angle adjusting portions formed at such two of the rising portions as continue to the corner arranged orthogonally of the corner having the spring receiving portion arranged therein, for receiving the screws and for adjusting the angle with the screws;

when the protrusions are arranged to abut against the ball seats, the spring stopper portion and the spring receiving portion confront each other, the spring stopper portion has a protrusion provided with a slope formed to confront the post portion whereas the spring receiving portion is provided, on its side facing the side of the post portion, with a recess having no side wall portion; and the spring has its one end portion fitted on the protrusion and its other end portion fitted in the protrusion thereby to prevent the spring from coming out and to apply an elastic force to the slide base through the spring receiving portion.

2. An optical head for recording/reading data by irradiating an optical disk with a laser beam, comprising:

a slide base; and an actuator for holding an objective lens mounted on the slide base for irradiating the optical disk with the laser beam;

wherein the slide base includes: a spring stopper rib having a post portion protruding from the slide base, and a spring stopper portion arranged perpendicular to the post portion and in parallel with the slide base; and three ball seats for forming a common spherical face;

the actuator includes: a lens holder for holding the objective lens; an actuator base for arranging the lens holder therein; a spring for biasing the actuator base; and screws for adjusting the angle of and fixing the actuator base;

the actuator base includes: a rectangular bottom portion; a plurality of protrusions arranged on the back side of the bottom portion and having their leading ends formed into ball shapes to abut against the ball seats; a spring receiving portion protruding from the vicinity of a predetermined corner of the bottom portion to the same plane as that of the bottom portion, for receiving the spring; and angle adjusting portions formed at such two of the four sides of the bottom portion as continue to the corner arranged orthogonally of the corner having the spring receiving portion arranged therein, for receiving the screws and for adjusting the angle with the screws;

when the protrusions are arranged to abut against the ball seats, the spring stopper portion and the spring receiving portion confront each other, the spring stopper portion and the spring receiving portion have a come-out preventing portion for preventing the spring from coming out; and the spring has its two end portions individually engaging with the come-out preventing portion thereby to prevent the spring from coming out and to apply an elastic force to the slide base through the spring receiving portion.

3. The optical head as set forth in claim 2, wherein the come-out preventing portion belonging to the spring receiving portion is a recess.

4. The optical head as set forth in claim 2, wherein the come-out preventing portion belonging to the spring receiving portion is a protrusion.

5. The optical head as set forth in claim 2, wherein the come-out preventing portion belonging to the spring receiving portion is a protrusion inclined to shorten the distance from the spring receiving portion toward the post portion.

* * * * *